US010218625B2

(12) United States Patent
Chao et al.

(10) Patent No.: US 10,218,625 B2
(45) Date of Patent: Feb. 26, 2019

(54) METHODS AND APPARATUS FOR ALLEVIATING CONGESTION AT A SWITCH, SUCH AS A SHALLOW BUFFERED SWITCH

(71) Applicant: New York University, New York, NY (US)

(72) Inventors: H. Jonathan Chao, Holmdel, NJ (US); Kuan-yin Chen, Astoria, NY (US); Yang Xu, Livingston, NJ (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 15/474,445

(22) Filed: Mar. 30, 2017

(65) Prior Publication Data

US 2017/0289048 A1     Oct. 5, 2017

Related U.S. Application Data

(60) Provisional application No. 62/315,377, filed on Mar. 30, 2016.

(51) Int. Cl.
| | | |
|---|---|---|
| *H04L 12/819* | (2013.01) | |
| *H04L 12/26* | (2006.01) | |
| *H04L 12/835* | (2013.01) | |
| *H04L 12/801* | (2013.01) | |

(52) U.S. Cl.
CPC .......... *H04L 47/21* (2013.01); *H04L 43/0864* (2013.01); *H04L 43/14* (2013.01); *H04L 47/30* (2013.01); *H04L 43/16* (2013.01); *H04L 47/11* (2013.01)

(58) Field of Classification Search
None
See application file for complete search history.

(56) References Cited

U.S. PATENT DOCUMENTS

| | | | | |
|---|---|---|---|---|
| 5,475,682 | A * | 12/1995 | Choudhury | ......... H04L 12/5602 370/229 |
| 7,809,007 | B2 * | 10/2010 | Mayhew | ............. H04L 47/6205 370/235 |
| 9,077,619 | B2 * | 7/2015 | Edsall | ..................... H04L 43/08 |
| 2003/0115355 | A1 * | 6/2003 | Cometto | ................ H04L 47/12 709/234 |

(Continued)

*Primary Examiner* — Hong S Cho
(74) *Attorney, Agent, or Firm* — John C. Pokotylo; Pokotylo Patent Services

(57) ABSTRACT

Collisions and/or congestion at output ports of switches can be relieved by: (a) receiving a packet; (b) extracting destination information from the packet; (c) looking up, using the extracted destination information, an output port; (d) determining whether to redirect the packet based on a congestion level of a buffer of the output port; (f) when determining to redirect the packet, (1) dispatching the packet to a dedicated reservoir port of the switch, wherein the reservoir port enforces a queue discipline, (2) receiving, by a reservoir, the redirected packet, (3) temporarily buffering, in an internal queue of the reservoir, the redirected packet, and (4) sending the temporarily buffered packet back to the switch. Otherwise, the packet is dispatched to the output port of the switch. Packets sent back to the switch are paced to relieve collisions and congestion at the switch output port.

20 Claims, 12 Drawing Sheets

(56) References Cited

U.S. PATENT DOCUMENTS

| | | | |
|---|---|---|---|
| 2005/0108444 A1* | 5/2005 | Flauaus | H04L 41/0853 710/15 |
| 2005/0254330 A1* | 11/2005 | Mick | H04L 47/568 365/230.05 |
| 2007/0177621 A1* | 8/2007 | Chang | H04L 47/10 370/412 |
| 2014/0269302 A1* | 9/2014 | Morandin | H04L 47/27 370/235 |
| 2016/0344631 A1* | 11/2016 | Krishnamurthy | H04L 47/115 |
| 2017/0339071 A1* | 11/2017 | Cheng | H04L 49/25 |

* cited by examiner

1100

METHODS AND APPARATUS FOR ALLEVIATING CONGESTION AT A SWITCH, SUCH AS A SHALLOW BUFFERED SWITCH

§ 1. RELATED APPLICATION(S)

This application claims benefit to U.S. Provisional Application Ser. No. 62/315,377, "MEMORY RESERVOIR: COMBINE SDN AND NFV FOR AGILE TRAFFIC ENGINEERING FOR HIGH UTILIZATION," filed on Mar. 30, 2016 and listing Kuan-yin CHEN, Yang X U, and H. Jonathan CHAO as the inventors (referred to as "the '377 provisional" and incorporated herein by reference). The scope of the present invention is not limited to any requirements of the specific embodiments described in '377 provisional.

§ 2. BACKGROUND

§ 2.1 Field of the Invention

The present invention concerns communications networks. More specifically, the present invention concerns relieving collisions and/or congestion at output ports of switches, especially in shallow-buffered commodity switches.

§ 2.2 Background Information

§ 2.2.1 Long-Term and Short-Term Burstiness of Internet Traffic

Internet traffic is intrinsically bursty. This stresses switch buffers in communications networks. For example, Internet traffic exhibits self-similarity (See, e.g., the article: M. E. Crovella and A. Bestavros, "Self-Similarity in World Wide Web Traffic: Evidence and Possible Causes," *IEEE/ACM Transactions on Networking*, Vol. 5, No. 6, pp. 835-846, 1997, incorporated herein by reference) and shows burstiness in various time scales. Burstiness and resulting congestion at different time scales calls for different relief measures. Long-term burstiness (and resulting congestion), observed in the time frame of tens of seconds or even minutes, is mainly caused by fluctuations in end-user demands. Long-term burstiness (and resulting congestion) is generally handled by traffic engineering or multi-path routing. Transient burstiness (and resulting congestion), in the sub-second time scale, on the other hand, is mainly caused by the intrinsically bursty nature of TCP behavior and the randomness of flows. It is generally handled by providing buffers at network devices to absorb the burstiness.

Bursty traffic has two major negative effects on Internet infrastructure: (1) underutilization of bottleneck links; and (2) performance degradation for end users, particularly those using TCP as the underlying transport layer protocol. This is because transient congestion at bottleneck links causes packet losses, and frequent packet losses in turn cause excessive congestion window (cwnd) backoffs or Retransmission Timeout ("RTO") as parts of TCP congestion control. As a result, TCP end hosts become overly conservative and fail to efficiently use available bandwidth resources.

Internet service providers ("ISPs") are deploying expensive high speed links in operational networks. However, these links tend to be underutilized due to Internet traffic burstiness. Commodity switches, in which packet buffers do not enjoy the same scalability with line speed, are especially vulnerable to traffic fluctuations. Over provisioning packet buffers can lead to significant cost increase, while network-wide traffic engineering may not be agile enough to react to transient congestions.

§ 2.2.2 The Challenge of Burstiness at Shallow-Buffered Switches

The Internet's demand for high bandwidth is continuously growing. While the line speed of modern switching devices grows beyond multi-Gbps scale, their buffer size has not scaled up proportionally. This becomes a major limiting factor of Internet development. (See, e.g., the article: G. Lu, R. Miao, Y. Xiong, and C. Guo, "Using CPU as a Traffic Coprocessing Unit in Commodity Switches," *Proc. of ACM HotSDN '12*, 2012, incorporated herein by reference.)

This issue is even more of a concern as network operators move to low-cost merchant silicon switches (See, e.g., the article: Rob Sherwood, "Tutorial: White Box/Bare Metal Switches," available at http://www.bigswitch.com/sites/default/files/presentations/onugbaremetal-2014-final.pdf, accessed: August 2016, incorporated herein by reference), also known as "whiteboxes." Merchant silicon vendors are integrating switch functionalities onto single-chip solutions, but the high cost of line-speed accessible memory modules, as well as hardware design constraints like power consumption, heat dissipation and chip size, are preventing single-chip switches from having large buffers.

For example, large transient burstiness arriving at a shallow-buffered switch can lead to massive packet losses, resulting in lower system throughput and longer flow/task completion time. As will be discussed later, this problem can become acute in scenarios involving DDoS attacks and flash crowds and TCP incasts.

§ 2.2.3 Related Work

Hot Potato routing (See, e.g., the article: P. Baran, "On Distributed Communications Networks," *IEEE Transactions on Communications Systems*, Vol. 12, No. 1, pp. 1-9, March 1964, incorporated herein by reference) describes a scheme that deflects a packet to an alternative port if it cannot successfully buffer it on the planned port. DIBS (See, e.g., the article: K. Zarifis, R. Miao, M. Calder, E. Katz-Bassett, M. Yu, and J. Padhye, "DIBS: Just-in-Time Congestion Mitigation for Data Centers," *Proceedings of ACM EuroSys '14*, 2014, incorporated herein by reference) extends the idea of deflection routing to the datacenter network environment. Both Hot Potato routing and DIBS achieves the best of its potential under high path diversity environments, e.g., datacenter networks. Unfortunately, however, these schemes may cause local congestion to spread to a larger area, congesting more switches. More specifically, when congestion is severe, HotPotato and DIBS indefinitely spread traffic to a large area, which, in turn, can cause collateral damage to other network users' performance.

Previous works on active queue management include, for example, Random Early Detection ("RED") (See, e.g., the article: S. Floyd and V. Jacobson, "Random Early Detection Gateways for Congestion Avoidance," *IEEE/ACM Transaction of Networking*, Vol. 1, No. 4, 1993, incorporated herein by reference), Adaptive RED (See, e.g., the article: S. Floyd, R. Gummadi, and S. Shenker, "*Adaptive RED: An Algorithm for Increasing the Robustness of RED's Active Queue Management*," AT&T Center for Internet Research at ICSI, Tech. Rep., 2001, incorporated herein by reference), Robust RED (See, e.g., the article: C. Zhang, J. Yin, Z. Cai, and W. Chen, "RRED: Robust Red Algorithm to Counter Low-Rate Denial-of-Service Attacks," IEEE Communications Letters, Vol. 14, No. 5, May 2010, incorporated herein by reference), Controlled Delay (See, e.g., the article: Kathleen Nichols and Van Jacobson, "Controlling Queue Delay," *Communications of the ACM*, Vol. 55, No. 7, pp 42-50, July 2012, incorporated herein by reference), etc. Traditionally, AQM schemes rely on active packet dropping to signal senders to slow down their transmission. This takes at least one round trip time ("RTT") to be effective, and may cause a congestion window to shrink unnecessarily under transient overloads. Packet marking-based AQM such as Random Exponential Marking ("REM") (See, e.g., the article: S. Athuraliya, S. H. Low, V. H. Li, and Q. Yin, "REM: Active Queue Management," *IEEE Network*, Vol. 15, No. 3, pp. 48-53, May 2001, incorporated herein by reference), Adaptive REM (See, e.g., the article: J. Sun, M. Zukerman, and M. Palaniswami, "An Adaptive REM For Improving AQM Performance," 2008 *IEEE International Conference on Communications*, May 2008, pp. 75-79, incorporated herein by reference), and recently standardized DCTCP+Explicit Congestion Notification ("ECN") (See, e.g., the articles: M. Alizadeh, A. Greenberg, D. A. Maltz, J. Padhye, P. Patel, B. Prabhakar, S. Sengupta, and M. Sridharan, "Data Center TCP (DCTCP)," *SIGCOMM Comput. Commun. Rev.*, Vol. 41, No. 4, August 2010; and S. Floyd, "Specifying Alternate Semantics for the Explicit Congestion Notification (ECN) Field," *Internet Requests for Comments, BCP* 124, November 2006, both incorporated herein by reference) relies on specially allocated header markings to notify senders to slow down. Marking-based schemes avoid excessive active packet drops, and in general enforce softer congestion control. However, it would be useful to improve these schemes, or provide alternative schemes, to further reduce the packet loss.

§ 3. SUMMARY OF THE INVENTION

The problem of collisions and/or congestion at output ports of switches, especially in shallow-buffered commodity switches, can be solved by: (a) receiving by the switch, a packet; (b) extracting destination information from the packet; (c) looking up, using the extracted destination information, an output port for the packet; (d) determining whether or not to redirect the packet based on a congestion level of a buffer associated with the output port; (f) responsive to a determination to redirect the packet, (1) dispatching the packet to a dedicated reservoir port of the switch, wherein the reservoir port enforces a queue discipline, (2) receiving, by a reservoir, the redirected packet, (3) temporarily buffering, in an internal queue of the reservoir, the received, redirected packet, and (4) sending the temporarily buffered, received, redirected packet back to the switch. Otherwise, responsive to a determination to not redirect the packet, the packet is dispatched to the output port of the switch.

In at least some example embodiments consistent with the present invention, any packets sent back to the switch are paced such that collisions and congestion at the switch output port is relieved. This may be done, for example, by (1) providing a leaky bucket (LB) at an exit of the internal queue of the reservoir, and (2) adaptively setting a drain rate of the leaky bucket. In some such embodiments, the drain rate of the leaky bucket is adaptively set based on a congestion status of the switch inferred from information directly available at the reservoir.

In some example embodiments consistent with the present invention, the congestion status of the switch is inferred by: (a) repeatedly monitoring a number of packets received by the reservoir; (b) repeatedly calculating a rate of data detouring to the reservoir based on the monitored number of packets received by the reservoir; and (c) inferring that the congestion status of the switch is "congested" responsive to a determination that the calculated rate of data is greater than a preset threshold, and otherwise, inferring that the congestion status of the switch is "not congested" responsive to a determination that the calculated rate of data is not greater than the preset threshold. In some other example embodiments consistent with the present invention, the congestion status of the switch is inferred by: (a) periodically sending out, from the reservoir, with highest priority, a probe packet to the dedicated reservoir port of the of the switch, wherein the probe packet contains a timestamp marking its exit time from the reservoir; (b) recording the timestamp of the sent probe packet; (c) receiving by the reservoir, back from the switch, the previously sent probe packet; (d) calculating a total time delay experienced by the probe packet using the recorded time stamp and a time the probe packet was received back from the switch by the reservoir; and (e) inferring a switch congestion value from the total time delay.

In some example embodiments consistent with the present invention, any packets sent back to the switch from the reservoir are forwarded to the intended output port with a highest priority, or more generally, any packets sent back to the switch from the reservoir are not checked for further redirection more than a predetermined number of times (n) such that no packet can traverse the reservoir more than n+1 times.

In some example embodiments consistent with the present invention, the act of determining whether or not to redirect the packet based on a congestion level of a buffer associated with the output port includes: (a) determining whether or not the buffer associated with the output port is full; and (b) determining to redirect the packet responsive to a determination that the buffer associated with the output port is full, and otherwise, determining to not redirect the packet responsive to a determination that the buffer associated with the output port is not full. In some other example embodiments consistent with the present invention, the act of determining whether or not to redirect the packet based on a congestion level of a buffer associated with the output port includes: (a) querying an active queue management (AQM) module of the output port for a drop/mark determination; and (b) responsive to receiving a drop/mark determination from the AQM module, determining to redirect the packet instead of dropping the packet, and otherwise, responsive to receiving a determination from the AQM module to not drop/mark, not determining to redirect the packet.

§ 4. BRIEF DESCRIPTION OF THE DRAWINGS

Figure 6:
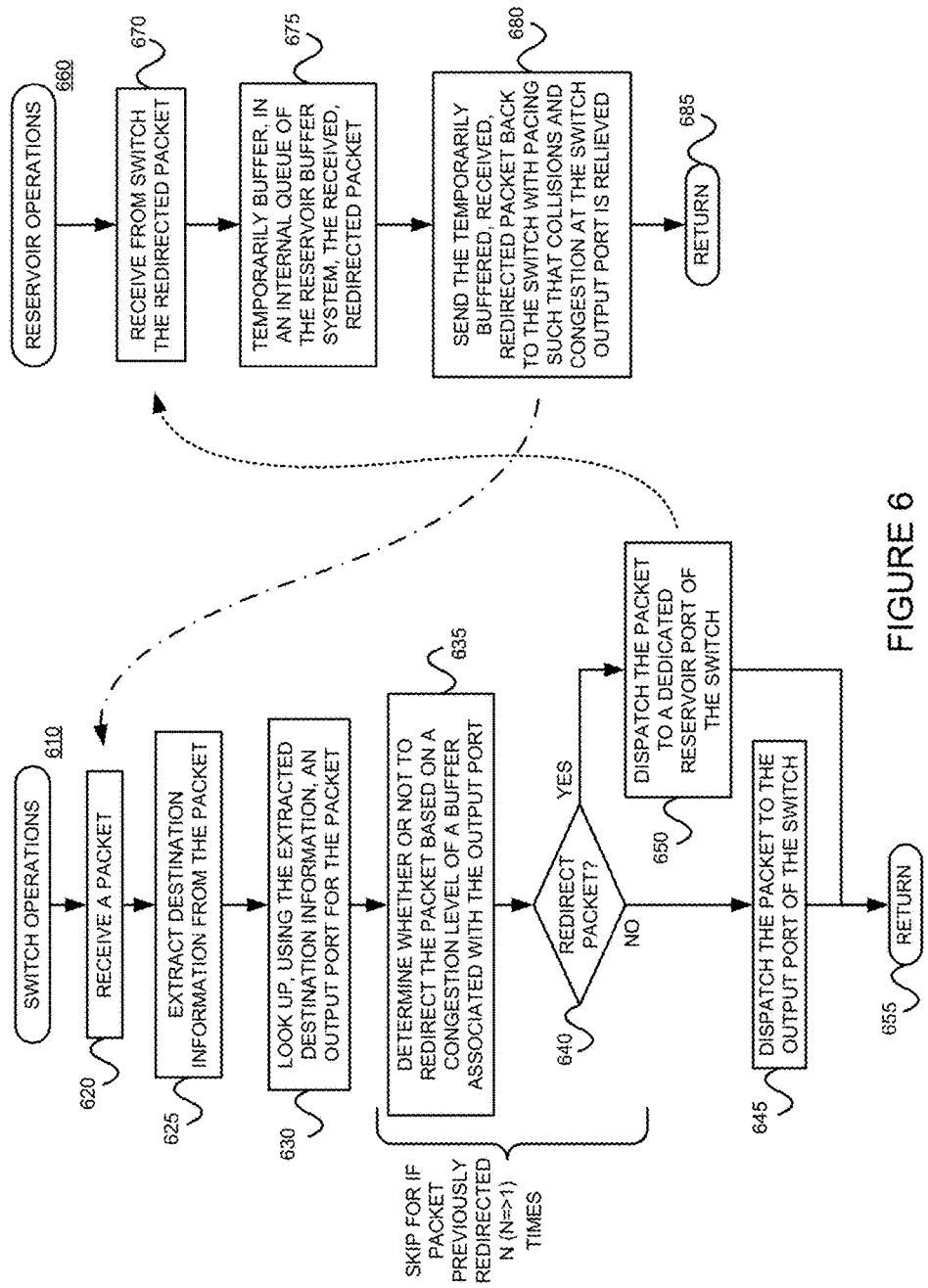

FIG. 6 includes flow diagrams of example methods, consistent with the present invention, that may be used by a switch and a reservoir buffer.

Figure 7:
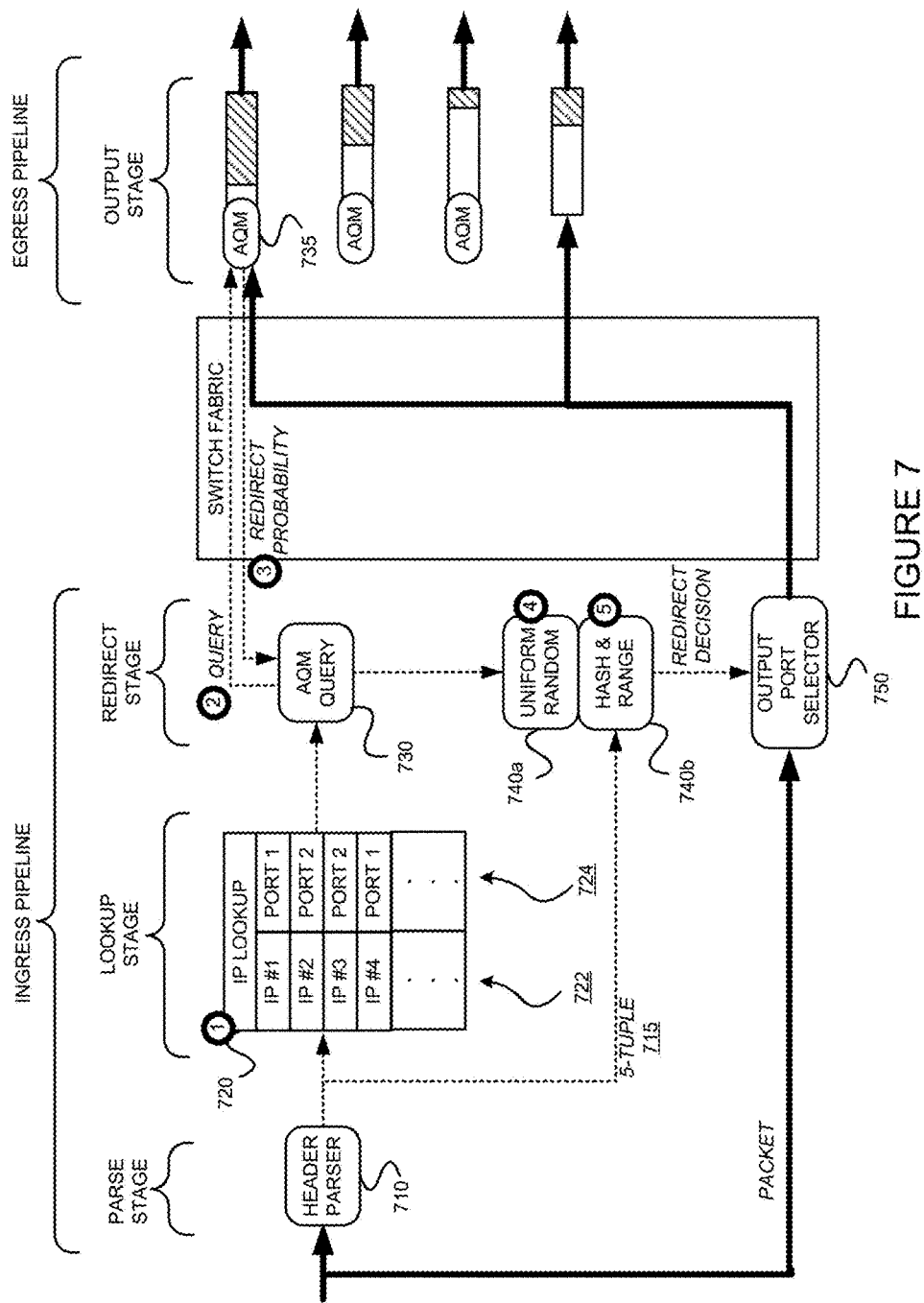

FIG. 7 is a block diagram of an example forwarding pipeline with redirect active queue management ("AQM") consistent with the present invention.

Figure 8:
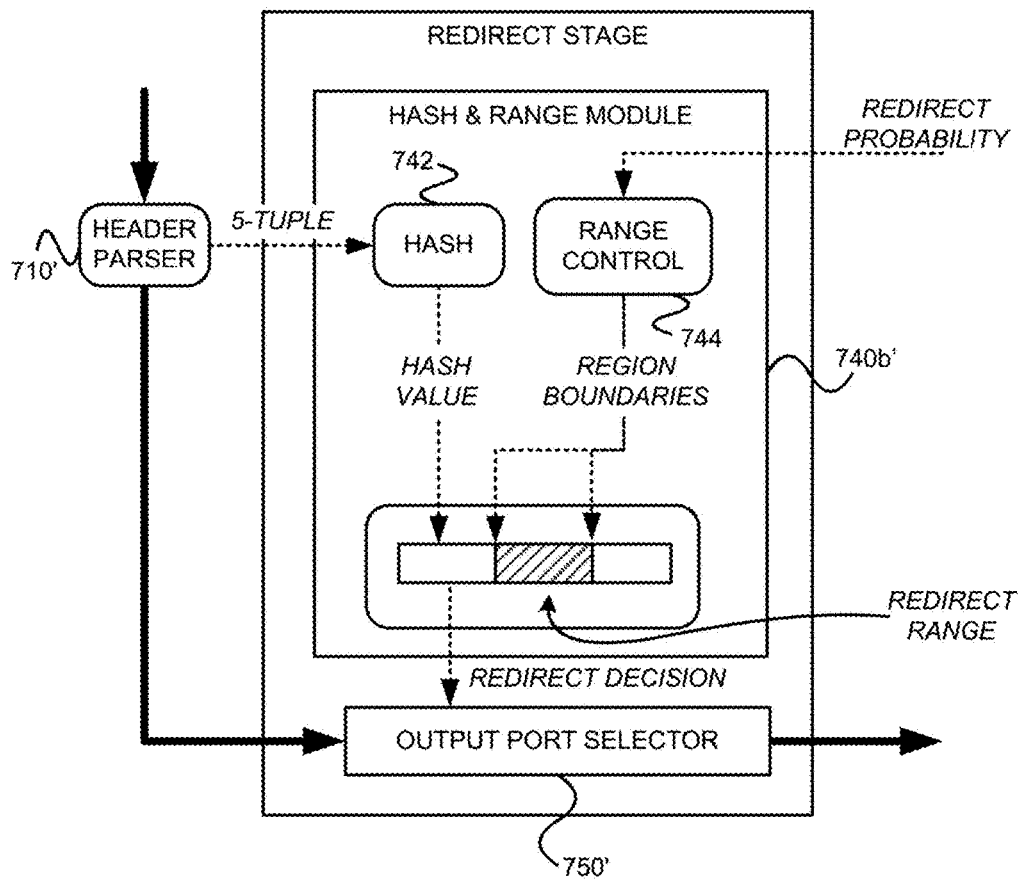

FIG. 8 is a block diagram illustrating operations of an example hash and range module consistent with the present invention.

Figure 9:
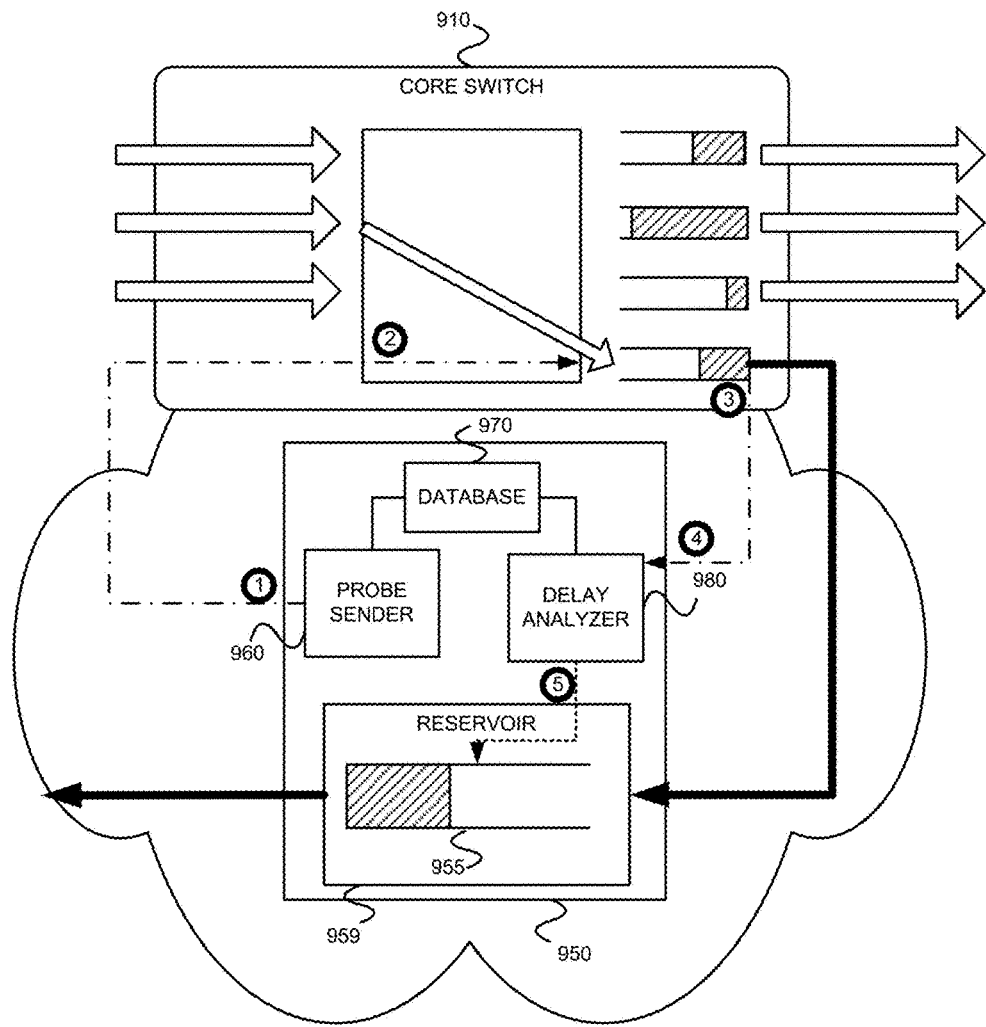

FIG. 9 is a block diagram illustrating example active probing pace control consistent with the present invention.

Figure 10:
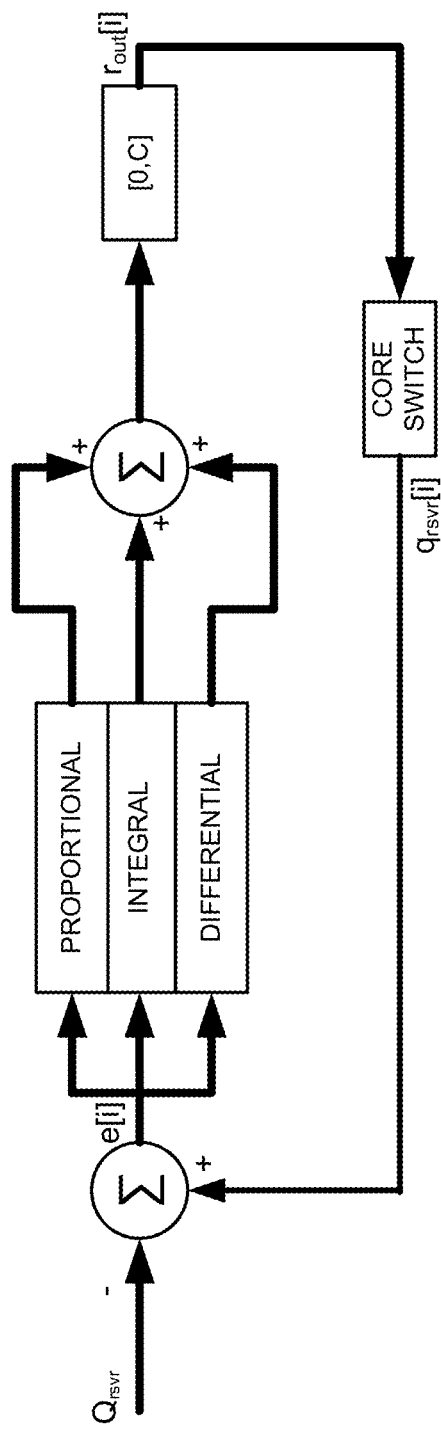

FIG. 10 is a block diagram of an example proportional-integral-differential ("PID") control for use in active probing pace control consistent with the present invention.

Figure 11:
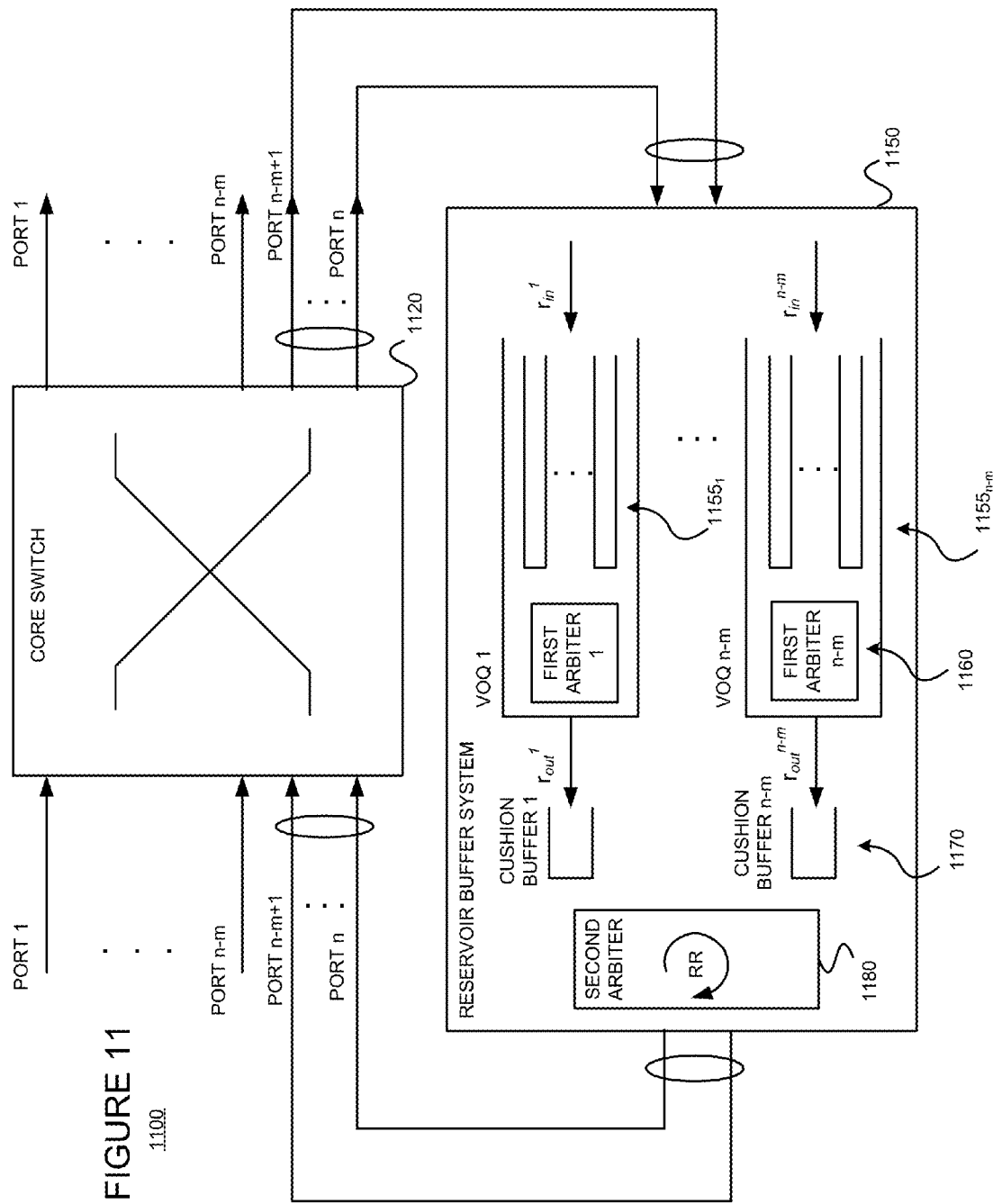

FIG. 11 is a block diagram of an example architecture including generalized memory reservoir architecture and an external switch, consistent with the present invention.

Figure 12:
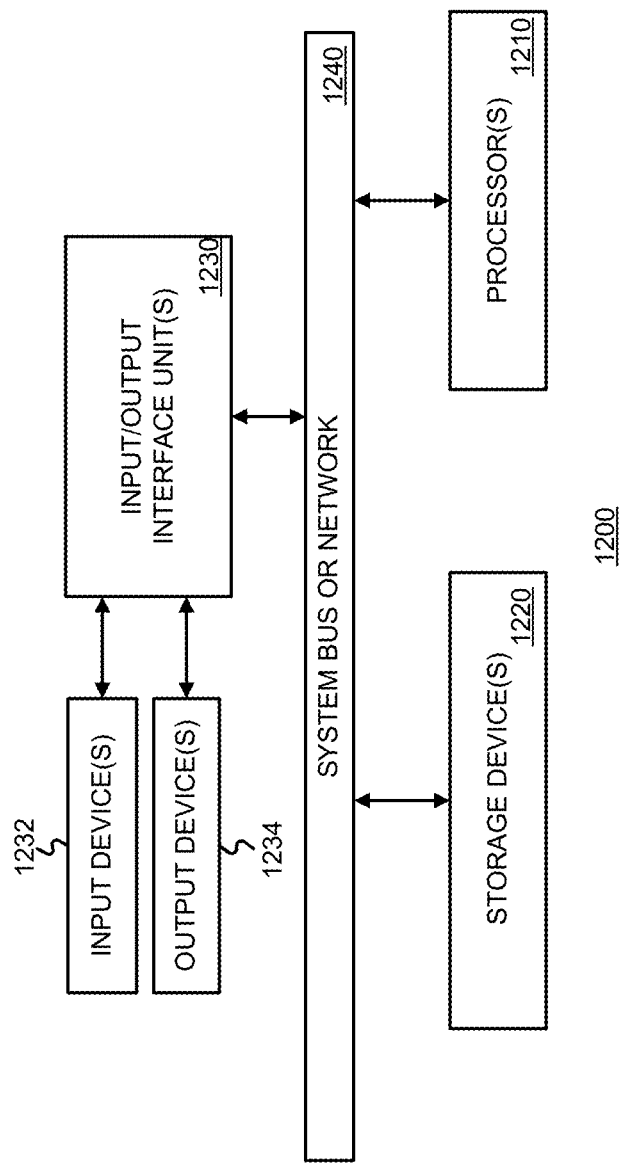

FIG. 12 is a block diagram of an example apparatus that may be used to perform various methods and/or store various information in a manner consistent with the present invention.

§ 5. DETAILED DESCRIPTION

The present invention may involve novel methods, apparatus, message formats and/or data structures for easing network congestion at a switch, such as a shallow-buffered switch. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Figure 1:
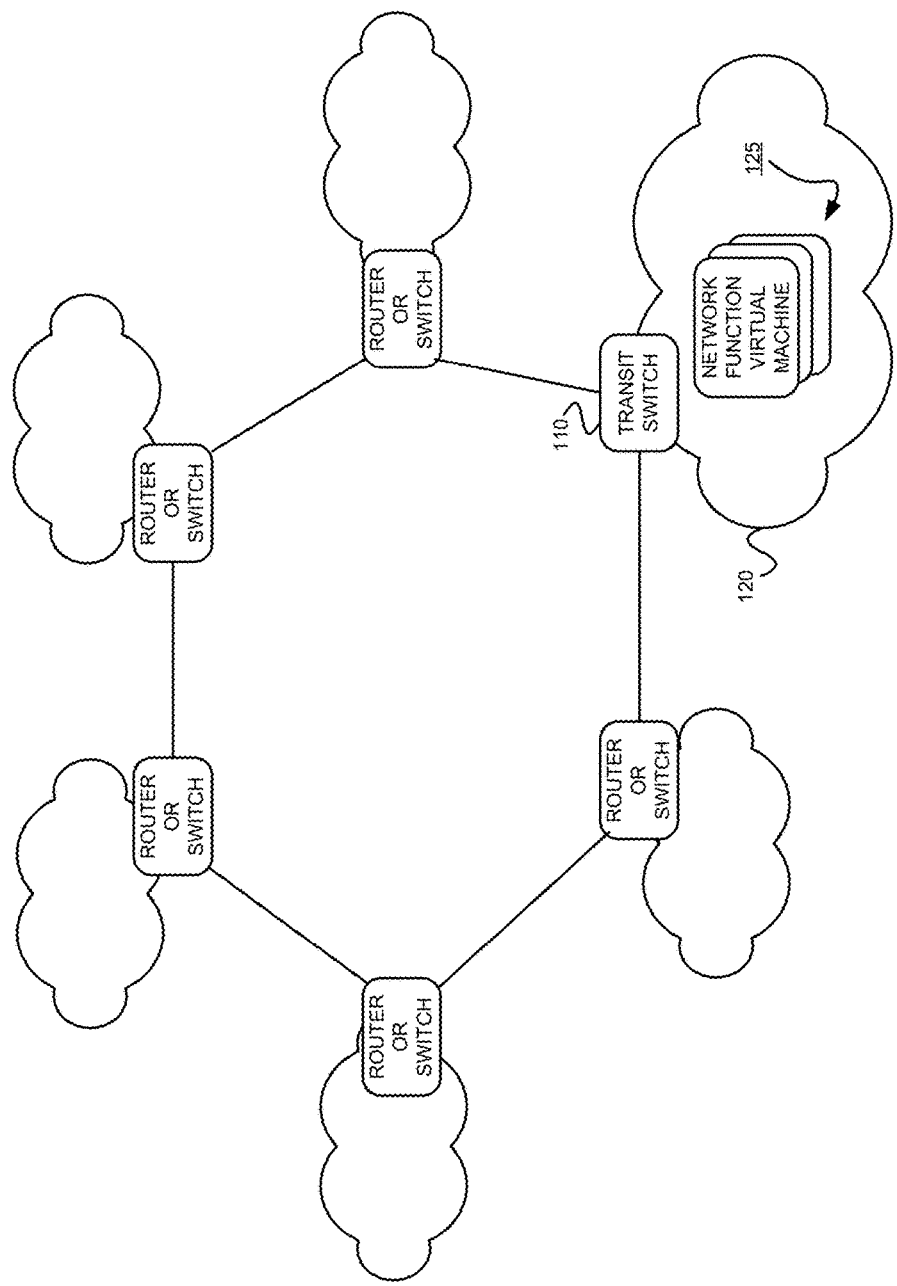
FIG. 1 illustrates an example network function virtualization infrastructure ("NFVI") architecture in which embodiments consistent with the present invention may be used.

Example embodiments consistent with the present invention provide a low-cost and simple solution that can mitigate transient traffic surges at shallow-buffered switches. Some such example embodiments consider Network Function Virtualization ("NFV"). AT&T's Domain 2.0 architecture (See, e.g., the article: AT&T, "AT&T Domain 2.0 Vision White Paper," Whitepaper, 2014, incorporated herein by reference) is illustrated by FIG. 1. This architecture is a good example of recent ISP-level NFV deployment. Important characteristics of ISP-level NFV architecture include: (1) the replacement of costly vendor-specific transit switches with cheaper commodity hardware (commonly referred to as "whiteboxes") (See element 110 of FIG. 1); (2) the deployment of small-to-medium sized datacenters named Network Function Virtualization Infrastructure ("NFVI") clouds near major switching nodes (See element 120 of FIGS. 1); and (3) the delegation of customized complex network functions, such as security or advanced quality of service ("QoS"), from transit switches to virtual machines ("VMs") (See elements 125 of FIG. 1) running in local NFVI clouds. Using whiteboxes enables the ISP to minimize infrastructure cost and maintenance cycle, while virtualizing network functions enables elastic provisioning and rapid customization. Overall, NFV technologies make network operation more economical and flexible.

In the following, § 5.1 provides examples that demonstrate how bursty traffic can harm system performance. Then, details of example memory reservoir systems consistent with the present invention are described in § 5.2. Thereafter, § 5.3 describes an example generalized memory reservoir design which considers multiple reservoir ports at the core switch and multiple queues in the packet buffer of reservoir. Finally, § 5.4 provides some conclusions.

§ 5.1 How Bursty Traffic Can Harm System Performance

This section describes two well-known case studies to illustrate the impact of bursty traffic on network performance. The first case, discussed in § 5.1.1, considers low-rate distributed denial-of-service (DDoS) attacks (See, e.g., the articles: A. Kuzmanovic and E. W. Knightly, "Low-Rate TCP-Targeted Denial of Service Attacks: The Shrew vs. the Mice And Elephants," *Proc. of ACM SIGCOMM* '03, 2003; and G. Yang, M. Gerla, and M. Y. Sanadidi, "Defense Against Low-Rate TCP Targeted Denial-of-Service Attacks," *Proc. of IEEE ISCC* '04, June 2004, both incorporated herein by reference), also known as reduction of quality ("RoQ") attacks (See, e.g., the article: A. Shevtekar and N. Ansari, "A Router-Based Technique to Mitigate Reduction of Quality (RoQ) Attacks," *Computer Networking*, Vol. 52, No. 5, pp. 957-970, April 2008, incorporated herein by reference.).

The second case, discussed in § 5.1.2, considers flash crowds in the context of large scale networks, or TCP incast (See, e.g., the article: A. S. W. Tam, K. Xi, Y. Xu, and H. J. Chao, "Preventing TCP Incast Throughput Collapse at The Initiation, Continuation, and Termination," *Proc. of IWQoS* 2012, June 2012, incorporated herein by reference) in the context of datacenter networks.

To further demonstrate the impact of bursty Internet traffic on network performance, the present inventors conducted small-scale experiments on the ns-3 open source network simulation platform. (See, e.g., the article: George F. Riley and Thomas R. Henderson, "The ns-3 Network Simulator," *Modeling and Tools for Network Simulation*, pp 15-34, Springer, incorporated herein by reference.) The dumbbell network topology 200 used, shown in FIG. 2, consists of two routers or switches 210a and 210b and multiple sending end hosts 220/230 and receiving end hosts 240/250. The bottleneck link 260, which connects the two routers 210a/210b in the topology, has bandwidth of 100 Mbps and propagation delay of 10 milliseconds. The leaf links 270/280/290/295, which connect the routers 210a/210b with the end hosts, have 100 Mbps bandwidth and 1 millisecond delay. The switching fabrics of both routers 210a/210b are output-queued ("OQ"), with per-port buffer limit set to the product of bottleneck bandwidth and end-to-end propagation delay.

In this case, it is equivalent to 150 KB of memory, or 100 full sized packets (with link MTU set to 1500 bytes).

§ 5.1.1 Low-Rate DDoS Attacks

In the case of a low-rate DDoS attack, the attack coordinator uses an army of compromised hosts (commonly referred to as "zombies") 230 to send out short but intense traffic pulses (indicated with dot-dash lines). These would cause packet drops in victim TCP connections, forcing the TCP connections to reduce their congestion windows and, consequently, causing them to suffer from degraded throughput. Low-rate DDoS attacks are more difficult to detect than common brute-force ones, because the pulses are short, and, overall, the attacks have low bandwidth footprints. In some cases, the attacking pulses can be deliberately timed to block out subsequent TCP retransmission attempts, resulting in continuous congestion window shrink and near-zero throughput.

Figure 3:
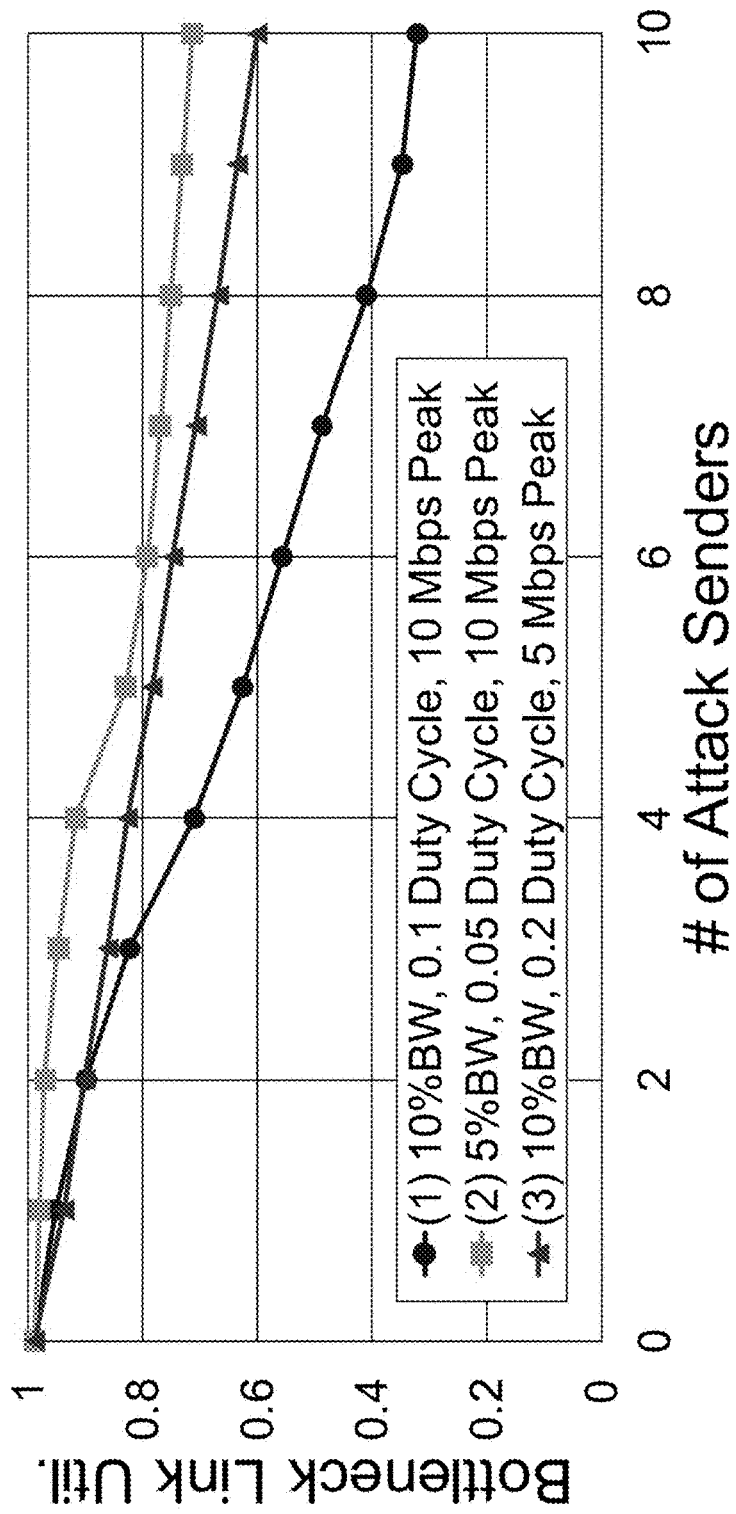
FIG. 3 is a graph which illustrates a bottleneck of link utilization resulting from low-rate DDoS experiments.

In one experiment, the present inventors set up ten (10) sender/receiver pairs 220/240, each maintaining a long-standing TCP connection, as the baseline traffic. On the other hand, a variable number of attack sender/receiver pairs 230/250 was installed. Each of the attack senders 230 sends UDP pulse trains to interrupt the baseline flows. Curve (1) in FIG. 3 shows the case in which each sender's peak sending rate is set to 10 Mbps, and pulse train period is set to 250 milliseconds, matching the minimum RTO of end hosts' TCP stacks. The pulse duty cycle is 10% of the period, which converts to 10% of long term average bottleneck bandwidth utilization when 10 attack senders are activated.

The bottleneck link's utilization (including both baseline and attack traffic) was used to measure the impact of pulse attacks on baseline traffic. The results show that the higher the attack intensity, the more reduction in bottleneck link utilization observed. This is because the pulse-triggered congestion events force baseline TCP connections to back-off, and block out their subsequent retransmission attempts, which results in extra utilization loss at the bottleneck link besides what is taken by the attack traffic. Less intensive (Curve (2) in FIG. 3) and less bursty (Curve (3) in FIG. 3) cases result in reduced, but still significant damage to bottleneck link utilization.

§ 5.1.2 Flash Crowds and TCP Incasts

In the case of flash crowds, massive amount of bulk-sending TCP connections arrive at an end server or a bottleneck link in a bursty manner, mostly due to a popular uploading service or synchronous data requests sent out by an arbitrator, commonly seen in applications like MapReduce. (See, e.g., the article: J. Dean and S. Ghemawat, "Mapreduce: Simplified Data Processing on Large Clusters," *Communications ACM*, Vol. 51, No. 1, pp. 107-113, January 2008, incorporated herein by reference.) Ideally, the TCP connections will fairly and fully share the bottleneck bandwidth. In reality, however, the TCP connections repeatedly collide and backoff, causing congestion collapse and underutilization of the network resources.

Figure 2:
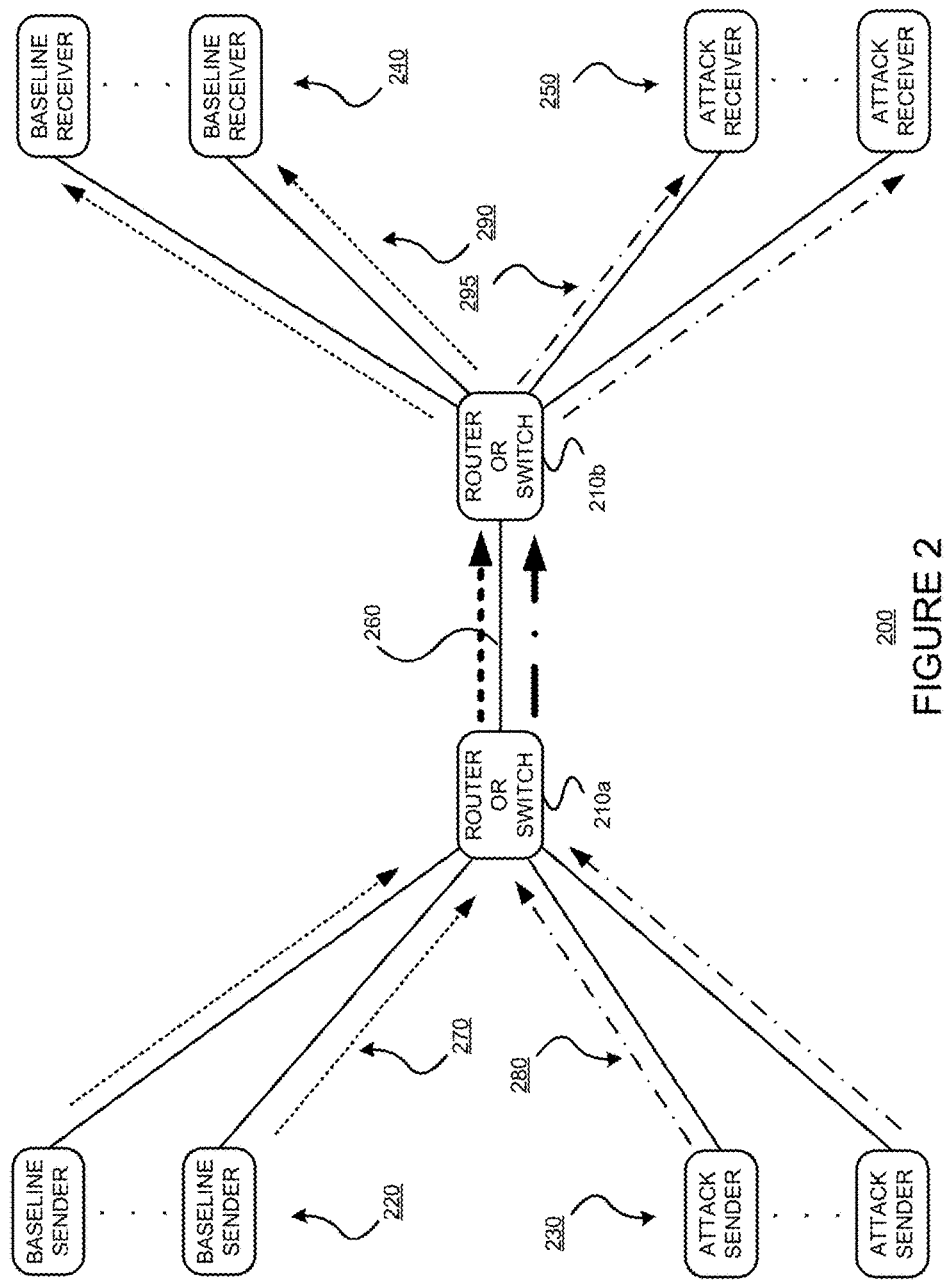
FIG. 2 illustrates a dumbbell topology used to explain the problem of network congestion.

The topology 200 of FIG. 2, described above, was used in experiments in which synchronous TCP bulk transfer sessions were injected, in order to examine the impact of flash crowds/TCP incasts on network performance. Each session transferred a fixed size of 1.5 MBs application layer data from the left to the right side of the dumbbell network 200. The impact with the metric "session completion time," which is defined by the time difference between the first packet transmission and the complete receipt of all 1.5 MB transfers at the application layer, was measured.

Figure 4:
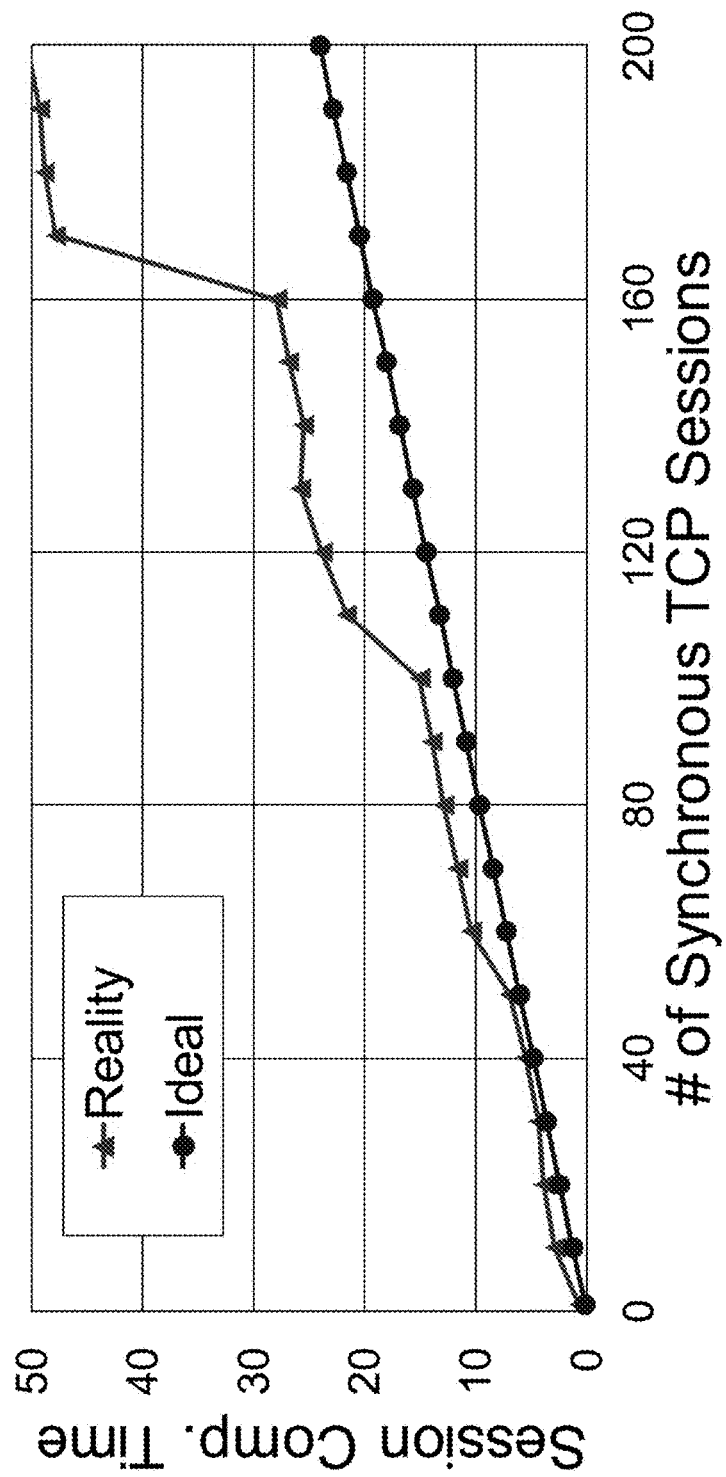
FIG. 4 is a graph which illustrates task completion time results from TCP incast experiments.

To reiterate, ideally, the bottleneck link bandwidth will be fairly and fully shared among all sessions, and the session completion time shall exhibit a linear trend with the number of synchronous sessions, similar to the "Ideal" curve in FIG. 4. However, in reality, the session completion time exhibits superlinear growth, as synchronous retransmission attempts will repeatedly collide with each other and force each TCP session's congestion window into deeper reduction, as indicated by the "Reality" curve in FIG. 4.

§ 5.2 System Design

This section will describe the design of example memory reservoir embodiments consistent with the present invention. A high-level view of an example memory reservoir system architecture is described in § 5.2.1. Then, control components of the system and design details of example embodiments of such components are described in § 5.2.2.

§ 5.2.1 System Overview

An example memory reservoir system which may be used in the context of the NFV architecture shown in FIG. 1, includes of two main components: (1) a "core switch" of a larger network, which is also attached to the local NFVI cloud; and (2) a reservoir buffer system (also referred to simply as a "reservoir"), which may be implemented as a software-based, virtual network function ("VNF") running in the NFVI cloud or on a physical server, connected to the core switch via one or multiple reserved switch ports. As will be described below, a packet buffer in the reservoir can be a single queue, or multiple queues.

Figure 5:
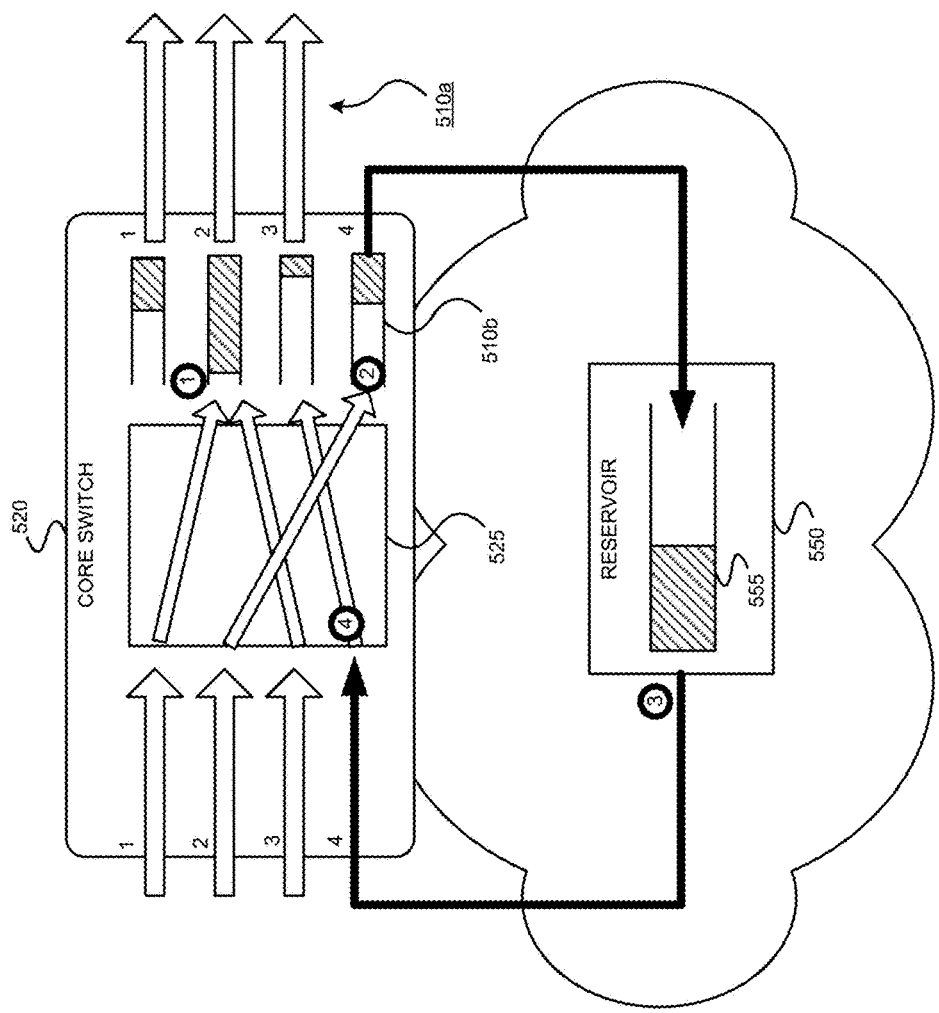
FIG. 5 is a block diagram of an example architecture including a memory reservoir used with an external switch in a manner consistent with the present invention.

FIG. 5 illustrates a simplified view of the overall architecture 500. In the settings, all switch ports but one (Ports 1, 2 and 3) 510a are transit ports carrying transit traffic of a larger network, while a reservoir port (Port 4) 510b is reserved and connected to the reservoir 550. Note that although this architecture 500 focuses on an output-buffered ("OB") switch architecture (in which each egress port has a dedicated fixed-size packet buffer, while the ingress ports have no buffers), example embodiments consistent with the present invention can work with any switch architecture with dedicated output buffers (that is, buffers associated with corresponding output ports), such as combined input and output queues ("CIOQ"), or any switch architecture with logically shared output buffers, such as shared-memory ("SM").

Note that although only one reservoir port 510b and only one reservoir instance 550 are shown in FIG. 5, extra reservoir instances and reservoir ports (that is, the core switch ports reserved for reservoir connection) can be added to the system for higher processing capacity and for load balancing. For example, some example memory reservoir architectures may have a high-capacity reservoir connected to the core switch via multiple reservoir ports, while some other example memory reservoir architectures may have an array of small reservoirs, each connected to the core switch via a reservoir port.

In this section, a simplified example memory reservoir architecture is described (i.e., in which the core switch has only one reservoir port connecting to a reservoir which implements a single FIFO queue) for the sake of simplicity. Later, a generalized memory reservoir architecture (i.e., in which the core switch has multiple reservoir ports and/or the reservoir has multiple queues) is described in § 5.3.

In this section, it is assumed that all ports are bi-directional, and all links are full-duplex. However, these are not necessary conditions.

The circled numbers in FIG. 5 are used to describe an example sequence of operations in the example memory reservoir architecture 500. When a packet arrives at the core switch 520, the switch fabric 525 performs a destination lookup. However, before actually dispatching the packet, the switch fabric 525 would query the intended output port 510a for a redirection decision. The output port 510a may decide to redirect the packet if it senses a high congestion level (e.g., if its corresponding buffer is full or filled to a level greater than a predetermined congestion threshold). (See the circled-1.) Next, assume that the output port 510a decides to redirect the packet to the reservoir. In this case, the packet is dispatched to the dedicated reservoir port 510b. (See the circled-2.) The reservoir port 510b may enforce a simple FIFO drop-tail queue discipline, and does not steer packets to another port.

The reservoir 550 receives any redirected packets, temporarily buffers them in its internal queue 555, and later send them back to the core switch 520. (See the circled-3.) In the example of FIG. 5, the internal queue 555 of the reservoir 550 also enforces a simple FIFO discipline, but the return traffic is "paced" (for example, using methods described later) to avoid further collision and ensure congestion is not aggravated.

Finally, the packets returned to the core switch 520 are forwarded to the intended output port with highest priority. (See the circled-4.) In some example embodiments, redirection does not apply to returned, previously redirected, packets. This guarantees no packet would traverse the reservoir more than once. (Note that a return packet may still be tail-dropped if it encounters a full output queue.) In other example embodiments, redirection can be applied to a given packet or flow of packets a limited number of times.

FIG. 6 includes flow diagrams of example methods 610 and 660, consistent with the present invention, that may be used by a switch and a reservoir. An example switch operations method 610 is shown on the left side of FIG. 6, while an example reservoir operations method 660 is shown on the right side of FIG. 6.

Referring first to the left side of FIG. 6, the switch (Recall, e.g., 520) receives a packet (620), extracts destination information from the packet (625), looks up, using the extracted destination information, an output port for the packet (630), and determines whether or not to redirect the packet based on a congestion level of a buffer associated with the output port (635). Responsive to a determination to redirect the packet (640, YES), the packet is dispatched to a dedicated reservoir port (Recall, e.g., 510b) of the switch (650) and eventually sent to the reservoir (Recall, e.g., 550.). The reservoir port may enforce a queue discipline. Referring back to 640, responsive to a determination to not redirect the packet (640, NO), the packet is dispatched to the output port of the switch as normal (645).

Referring now to the right side of FIG. 6, the reservoir (Recall, e.g., 550) receives the redirected packet (670), temporarily buffers, in an internal queue (Recall, e.g., 555) of the reservoir, the received, redirected packet (675), and sends the temporarily buffered, received, redirected packet back to the switch with "pacing" (680).

As should be appreciated from the foregoing description of FIGS. 5 and 6, two important aspects of the reservoir memory architecture include redirection control and "pace" control. Each is discussed in § 5.2.2 below.

§ 5.2.2 Redirection Control and "Pace" Control

As just noted above, two important aspects of the reservoir memory architecture include redirection control and "pace" control. Example ways to provide redirection control are described in § 5.2.2.1, while example ways to provide pace control are described in § 5.2.2.2.

§ 5.2.2.1 Redirection Control

Referring back to 635-650 of FIG. 6, redirection control may be performed by the core switch. Redirection control can make redirection decisions based on the congestion status of the output port to which the packet should be sent. Many commodity switches support a variety of active queue management ("AQM") schemes, which continuously monitor queue occupancy and actively drop packets based on such monitoring to slow down end-to-end traffic. Since commodity switches are mostly rigid and adding new algorithms can be very costly, the techniques described in this section can be implemented with minimal modifications to existing AQM functions in order to "repurpose" such AQM functions to support packet redirection.

An important goal of switch redirection control is to actively redirect the congesting traffic to avoid forced packet drops, thus preventing excessive performance collapse. Since commodity switches are usually rigid and difficult to upgrade with new features, the following three (3) redirect control options—deflection, packet-level redirect AQM, and hash-based redirect AQM—introduce minimal modification to the hardware and reuse existing functionalities.

§ 5.2.2.1.1 Deflection Redirect Control

This first redirection control technique requires only a minor alternation of the switching fabric's forwarding logic. Specifically, a packet is deflected to the reservoir port as long as its intended output queue is full (or more than a predetermined amount full). Note that in some example embodiments, deflection only applies to transit ports; it does not apply to the reservoir port. In some example embodiments, deflection does not apply to packets returned from the reservoir, or does not apply after a packet has already been deflected to the reservoir port a predetermined number of times.

§ 5.2.2.1.2 Packet-Level AQM Redirect Control

Traditionally, commodity switches support a variety of AQM schemes, such as random early detection ("RED") (See, e.g., the article: S. Floyd and V. Jacobson, "Random Early Detection Gateways for Congestion Avoidance," *IEEE/ACM Transaction of Networking*, Vol. 1, No. 4, 1993, incorporated herein by reference), adaptive random early detection ("ARED")(See, e.g., the article: S. Floyd, R. Gummadi, and S. Shenker, "Adaptive RED: An Algorithm for Increasing the Robustness of RED's Active Queue Management," *AT&T Center for Internet Research at ICSI, Tech. Rep.*, 2001, incorporated herein by reference), controlled delay (CoDel) (See, e.g., the article: Kathleen Nichols and Van Jacobson, "Controlling Queue Delay," *Communications of the ACM*, Vol. 55, No. 7, pp 42-50, July 2012, incorporated herein by reference), etc. In general, these AQM schemes actively and probabilistically drop (or mark)

packets based on certain congestion metrics, such as queue occupancy or packet delay. The dropping action in turn triggers end-to-end congestion control mechanisms of transport layer protocols, such as TCP, to slow down packet transmission and alleviate congestion.

Example packet-level AQM redirect control techniques consistent with the present invention "repurpose" these AQM functions to support redirection control. Specifically, whenever the AQM function decides to drop (or mark) a packet, the packet is instead redirected to the reservoir port. Also, when a full output queue is observed, the packet is redirected. Note that redirect AQM scheme does not apply to packets returned from the reservoir, or does not apply after a packet has already been redirected to the reservoir port a predetermined number of times.

The circled numbers (1-6) in FIG. 7 illustrate an example of operations by the forwarding procedure of an example packet-level redirect AQM technique. The header parser 710 first extracts the destination IP address and 5-tuple (source IP, destination IP, source port, destination port and protocol ID) 715. The destination lookup stage first performs an IP lookup 720 to determine the destination output port 724 for a corresponding destination IP address 722. (See the circled-1.)

Then, an AQM query module 730 in the redirect stage asks output port's AQM module 735 for a redirection probability. (See circled-2.) The AQM module 735 returns a redirection probability between 0 and 1. (See circled-3). It 735 may return 100% (i.e., a probability of 1) if it is a forced (full queue) redirection, or 0% (i.e., a probability of 0) if redirection function is not activated.

In this example packet-level redirect AQM technique, a uniform random floating point number (740a) is generated for each packet to determine whether to redirect or not. (See circled-4.) A Boolean true decision is made when $r \leq q$, where r is the random number and q is the retrieved redirection probability, and false otherwise. Finally, an output port selector 750 overwrites the output port if redirection is confirmed. (See circled-6.)

Different from conventional AQM which actively drops packets to force TCP senders to reduce their congestion window size, the redirect AQM scheme takes a softer approach of redirection instead of active drops. Similar effects can be still achieved, as detoured packets pick up higher round trip time ("RTT") and effectively slows down TCP connections. Also, redirect AQM may be applied to non-TCP bursty senders, which is especially useful under scenarios like UDP pulse attacks.

§ 5.2.2.1.3 Hash-Based AQM Redirect Control

Packet-level redirect AQM techniques such as just described in § 5.2.2.1.2 are prone to TCP out-of-order deliveries because redirection decisions are independently made for each packet. Alternative, example hash-based redirect AQM techniques can mitigate path fluctuation and maintain the packet order within each transport layer flow. The procedure of an example hash-based redirect AQM technique is described with reference to FIGS. 7 and 8. All the steps are the same as described in § 5.2.2.1.2 with reference to FIG. 7 above, except that the redirection decision is determined by a hash-and-range module 740b (See circled-5) instead of the uniform random number 740a.

Line-speed hashing on packet header fields are widely available in commodity switches, thanks to the popularity of hash-based path selection schemes such as, for example, equal-cost multipath ("ECMP") routing. Hash-based redirect AQM techniques can combine the hashing and output queue AQM modules in these switches.

FIG. 8 shows the details of an example hash-and-range module 740b'. In the packet parsing stage, header parser 710' extracts a packet's 5-tuple (namely source IP address, destination IP address, source port number, destination port number, and the protocol ID which altogether defines the transport layer flow the packet belongs to). In the example hash-and-range module 740b', the hash function 742 maps each distinct 5-tuple combination to a pseudo-random number within the function's hash range. For example, $[0; 2^M-1]$ if the output of the hash function is an M-bit unsigned integer. Meanwhile, the range control function 744 calculates the redirection range with the hash range based current packet's redirection probability, retrieved by the AQM query. (Recall the circled-3 in FIG. 7.) A simplistic way is to set the redirection region to $[0; \text{Round}(p\_(2^M-1))]$, where p is the redirection probability and $(2^M-1)$ is the hash range. Then, an arithmetic comparison is applied to the hash value and the redirection range. If the hash value falls into the range, the hash-and-range module 740b' will make a Boolean TRUE redirect decision to the output port selection module. Otherwise, it 740b' will make a Boolean FALSE redirect decision. The redirect decision is provided to the output port selector 750'.

§ 5.2.2.2 Reservoir Pace Control

Recall from § 5.2.2.1 above that the packets are redirected to the reservoir upon high congestion to avoid forced drops. The reservoir would then temporarily buffer the packets and send them back to the core switch. However, without properly "pacing" the return traffic, such returned traffic would likely collide with persisting congestion, making the situation worse. Therefore, the reservoir should intelligently schedule (or "pace") sending the redirected and buffered packets back to the switch to minimize collision on return, and/or to mitigate traffic surge. The reservoir may infer or explicitly obtain current congestion status to help the pacing decisions. However, inferring such current congestion status is preferred, especially if the core switch is a commodity switch with limited functionality.

The reservoir serves as a safe haven for packets, but this role is affected by traffic burstiness. It temporarily buffers redirected packets and will eventually send them back to the core switch for forwarding. The naive approach would be to send out the buffered packets at full line rate of the reservoir port. However, this ignores the switch's congestion status. Without any pace adjustment, the returned packets would likely collide with persisting congestion and effectively make the situation worse. Therefore, the reservoir should "pace" the return of the buffered packets to prevent further collisions. This can be done by attaching a leaky bucket ("LB"), whose drain rate can be adaptively set, at the exit of reservoir's internal buffer.

Generally, the pace control algorithm should obtain or infer (current) congestion status at the core switch. The drain rate of the LB can then be dynamically adjusted, based on such congestion status. Such adjustment may be used to achieve one or more goals. One goal is to avoid further condition. In this case, when congestion persists, the reservoir should slow down packet return to avoid further collision(s) at the switch. Another goal is to reduce queuing delay experienced by packets. In this case, when congestion fades away, the reservoir should speed up packet return to reduce queuing delay experienced by these packets. It would be desirable to achieve both of these goals.

A major challenge is understanding the core switch's congestion status. Although directly obtaining such information from the core switch would be useful, commodity switches do not typically support explicit query of their queue occupancies, and proprietary modifications would be needed to support this feature. Even if the reservoir could obtain such congestion status directly, communicating such status information (perhaps including queries) would impose high control plane overhead on the switches. This can prevent employing fine-grained control loop (e.g. millisecond level).

Therefore, instead of explicitly obtaining queue congestion status from the switch, the reservoir can infer the switch's congestion status from the evidence directly observable by the reservoir (e.g. input data rate to the reservoir). The reservoir can also infer the switch's congestion status by actively "probing" the switch (e.g., via its data plane as opposed to its control plane) to obtain the information without requiring switch-side modification. Two example pace control techniques—(1) on-off pace control and (2) active probing pace control—which allow the reservoir to infer the switches congestion status are described in §§ 5.2.2.2.1 and 5.2.2.2.2 below.

§ 5.2.2.2.1 Example On-Off Pace Control Techniques

On-off pace control refers to simple pace control techniques in which, when the reservoir observes a significant amount of incoming packets, it infers that the intended output port of these packets is suffering from heavy congestion. Based on this inference, the reservoir temporarily holds (e.g., continues to buffer or hold at its LB) these packets until it is inferred that the heavy congestion fades away. The following is pseudo-code for an example ON-OFF pace control algorithm:

---
Algorithm 1 On-off Pace Control Algorithm
---
Input Variables:
  rin[t]: Input data rate of time t
Output Variables:
  rout[t]: Output data rate of time t
Constant Parameters:
  θ Input data rate threshold for turning off output
  T: Observation cycle period
  C: Reservoir port line rate
1: for end of each observation window of length T do
2:   Calculate $r_{in}[t]$
3:   if $r_{in}[t] < \_$ then
4:     $r_{out}[t]$  C
5:   else
6:     $r_{out}[t]$  0
7:   end if
8:   Update the leaky bucket drain rate to $r_{out}[t + 1]$
9: end for
---

Using the foregoing example on-off pace control algorithm, the reservoir continuously monitors its input data rate. At the end of each observation cycle of length T, the reservoir calculates the rate of data detouring into it, denoted by $r_{in}[t]$. If the observed input data rate exceeds a certain preset threshold θ, the reservoir infers that there is a serious congestion in the switch, and, in response, shuts down the leaky bucket output by setting leaky bucket drain rate, $r_{out}[t]$, to zero. On the other hand, if $r_{in}[t]$ drops below θ, the reservoir infers that the congestion status has alleviated, and would resume sending buffered data back to the switch at full line rate.

§ 5.2.2.2.2 Example Active Probing Pace Control Techniques

The example on-off pace control goes either all-on (in which packets are returned to the switch at the line rate of the reservoir) or all-off (in which no packets are returned). So it is a very coarse-grained control mechanism, especially if the observation cycle length T is long.

Although directly querying the output queue occupancy of each transit port of the switch would impose considerable control plane overhead on the core switch, output queue occupancy of the reservoir port can be used as an indicator of the switch's overall congestion status, and this congestion status can be inferred by the reservoir without burdening the switch's control plane. The example active probing pace control techniques described below exploit the foregoing observations.

FIG. 9 is a block diagram illustrating the procedure of active probing pace control in a system 900 including the core switch 910 and a buffer reservoir system 950. As shown, the active probing module may include a probe sender 960, a database 970 and a delay analyzer 980, and may be developed as an application running independently from the reservoir's packet forwarding functions 959. The probe sender 960 and the delay analyzer 980 share information with each other (e.g., directly, or via the database 970).

The probe sender 960 periodically sends out probe packets, each containing a sequence number and a timestamp marking its exit time from the reservoir 950. (Note that other information that can be used to calculate a delay through the core switch 910 (e.g., a time stamp by itself) can be used instead of both a time stamp and sequence number.) Upon creation of a probe packet, the probe sender 960 will also create an entry in the database 970 recording the probe packet's related information. The probe packets are sent out to the reservoir port with highest priority, to avoid extra queuing delay within the reservoir. (See the circled-1.) The probe packets are destined for the reservoir 950 itself. When the core switch 910 receives a probe packet, it forwards it to the reservoir port. (See the circled-2.) The switch 910 applies default priority to the probe packets, and consequently, they will queue up with redirected packets at the reservoir port's output queue. (See the circled-3.) In the core switch 910, a probe packet will pick up some queuing delay. This queuing delay will be treated as an indicator of (and used to infer) congestion status of the switch 910 at the active probing module.

When the reservoir 950 receives a returning probe packet, it will send the packet to the delay analyzer 980. The delay analyzer 980 will then (1) look up the corresponding information in the database 970 and (2) calculate the total delay experienced by the probe packet. To derive a better estimate of the switch-side queuing delay, other delay sources such as reservoir link propagation delays and switch/reservoir processing delays, may be deducted from the total delay. In practice, however, these delay sources are expected to be negligible compared to the switch-side queuing delay. Further, since delays from these sources are expected to be relatively constant, their values can be estimated a priori.

A higher switch-side queuing delay indicates higher occupancy of the reservoir port's output queue, and hence implies more serious congestion status at the switch overall. The measured delay can be converted into reservoir port queue occupancy via a simple conversion:

$$q_{rsvr}[i]=d_{probe}[i] \times C \qquad (1)$$

where a $q_{rsvr}$ the occupancy of the reservoir port's output queue, $d_{probe}$ is the measured (using the recorded time stamp) switch-side queuing delay of the probe packet, C is the reservoir link's line rate, and i denotes the probe packet's sequence number. The effect of inter-frame gap at the reservoir port is small and can be neglected.

Since all probe packets follow the same looping path between the reservoir 950 and the core switch 910, a probe packet loss at the reservoir port is known when another one with higher sequence number returns to the reservoir 950 first. In this case, a high punishment value (e.g., equivalent to the size of the reservoir port buffer) can be placed on the lost probe packet's a $r_{rsvr}[i]$.

Given the probe packet delay obtained, the leaky bucket ("LB") drain rate can be controlled accordingly. (See the circled-5.) Here a feedback control mechanism can be applied to iteratively adapt the leaky bucket's drain rate to the dynamic congestion status at the core switch 910. As one example, a proportional-integral-derivative ("PID") control scheme may be used as the basis of the rate control algorithm. For discrete-time systems, the term proportional-summation-difference ("PSD") are often used, but this application uses PID-related terminologies, which are more commonly known.

PID control is a closed-loop control mechanism popular both in academic research and industrial systems. The main idea of PID control is to continuously monitor a process variable, calculate its error value from a desired setpoint, and adjust a control variable to minimize the error value, such that the process variable steadily converges around the setpoint. The term "PID" is derived from the relation between the control variable and the sequence of error values, which incorporates three terms: "proportional," which responds to current measured error value; "integral," which offsets accumulated effects of past error values; and "differential," which accounts for recent trends in error values. The mapping between system variables in example embodiments consistent with the present invention, their notations, and their roles in a PID control algorithm is as follows:

$q_{rsvr}[i]$: Inferred reservoir port queue occupancy for probe packet i, which corresponds to the "process variable."
$r_{out}[i]$: Leaky bucket drain rate, which corresponds to the "control variable."
$Q_{rsvr}$: Setpoint of $q_{rsvr}[i]$, which is a configurable "constant parameter."
$e[i]$: Error value. $e[i]=q_{rsvr}[i]-Q_{rsvr}$.

Referring to FIG. 10, the relation between $e[i]$ and $r_{out}[i]$ can be defined as follows:

$$r_{out}[i] = K_p e[i] + K_i \sum^{i} e[i] + K_d(e[i] - e[i-1]) \quad (2)$$

where $K_p$, $K_i$ and $K_d$ are configurable constant coefficients of proportional, integral and differential terms, respectively. In practice, $Q_{rsvr}$ is set to a small portion of reservoir port's output queue capacity. This ensures the adjustment of $r_{out}[i]$ works bi-directionally: a positive $e[i]$ value implies that the switch is suffering from a more serious congestion. In this case, $r_{out}[i]$ should be decremented (which means $K_p$ should be set to a negative constant) to avoid collision between return packets and congestion traffic, and vice-versa.

Similarly, if the summation of past $e[i]$ values is positive, or $q_{rsvr}[i]$ shows an increasing trend (i.e. $e[i]-e[i-1]>0$, $r_{out}[i]$), rout[i] should also decrease to offset the accumulative or trending effect. These cases imply that $K_i$ or $K_d$ should also be negative constants. Finally, obviously $r_{out}[i]$ should also be bounded in [0, C] interval, where C is the line rate of reservoir link and of course, the maximum allowed sending rate of the reservoir.

§ 5.3 Generalized Architecture of Memory Reservoir

Section 5.2 described simplified example versions of a memory reservoir system consistent with the present invention, where the core switch has only one reservoir port and the reservoir has only one queue for all packets detoured to it. (Recall, e.g., FIG. 5.) Such simplified example embodiments may suffer from performance degradation under the following two scenarios. First, when the load of excessive traffic is more than the line rate of reservoir port 510*b*, detoured packets may be dropped before entering the reservoir 550. Second, when multiples output ports 510*a* of the core switch 520 suffer from congestion, their packets will be detoured to reservoir 550 and buffered in the same FIFO drop-tail queue 555. Unfortunately, packets destined for a lightly congested output port will experience the same queuing delay inside reservoir 550 as those packets destined for a heavily congested output port(s). A generalized memory reservoir system architecture of that addresses these potential problems (by considering multiple reservoir ports at the core switch and more sophisticated queuing inside the reservoir) is described in § 5.3.1 below.

§ 5.3.1 Generalized Memory Reservoir Architecture

FIG. 11 is a block diagram of a generalized memory reservoir system architecture 1100. The core switch 1120 has n ports, among which m ports are used as reservoir ports. By providing (or provisioning) multiple reservoir ports, the core switch 1120 can tolerate larger burstiness with higher excessive data rate. The m reservoir ports can work in one of three modes: (1) single; (2) bundled; and (3) hybrid. Each of these three modes is now described.

In the single mode, each reservoir port connects to a separate reservoir. In the bundle mode, a group (or "bundle") of reservoir ports work together as a bundle port connecting to a single large reservoir instance. When the core switch redirects packets to the reservoir, it will send packets to m reservoir ports in a round-robin manner. In the bundle mode, the reservoir has one logical input port and one logical output port with bandwidth capacity m*C. Finally, in the hybrid mode, each reservoir port can either work alone connecting to a separate reservoir or work together with some of the other reservoir ports to form a bundle port.

The bundle mode is considered in the example described in § 5.3.2 below. However, the design can be easily modified to support the single and hybrid mode. For example, when there are multiple ports (or bundle ports) connecting to multiple reservoirs (they may have different capacity and port speed), we will number the reservoirs from #1 to #k. When the switch decides to redirect a packet to the reservoir system, it will select the reservoir based on hashing result (i.e., hash the packet header on a range between 1 to k, and if the result is r, the switch will redirect the packet to reservoir r.) To provide isolation between flows, the packet buffer at the reservoir 1150 is divided into n-m virtual output queues (VOQs) $1155_1$-$1155_{n-m}$ corresponding to the respective different output ports of the core switch 1120. Each VOQ $1155_1$-$1155_{n-m}$ can be further divided into per-flow or per-class/per-priority queues depending on requirements.

§ 5.3.2 Reservoir Scheduling and Active Probing Pace Control

Given multiple queues in the reservoir 1150, a scheduler is used to arbitrate packets to access the output port(s) of reservoir 1150. To simplify the implementation of the scheduler, its functions are divided into two (2) phases. In the first phase, pace control is performed on each VOQ $1155_1$-$1155_{n-m}$. Suppose $r_{out}^k[i]$ denotes the paced output data rate for $VOQ_k$. Packets at $VOQ_k$ will be sent out to a corresponding cushion buffer 1170 at rate $r_{out}^k[i]$ via a leaky bucket (not shown). The capacity of each cushion buffer 1170 is very small (e.g., size of one or two largest packets), and once full it will prevent the corresponding VOQ $1155_1$-$1155_{n-m}$ from sending any further packets via mechanisms such as back-pressure. The second phase of the scheduling uses a second arbiter 1180, which may be a round-robin arbiter for example. The second arbiter 1180 schedules packets from cushion buffers 1170 to the bundle output port, which has a capacity of m*C, where C is the capacity of each of the m links.

In order to decide $r_{out}^k[i]$ for each $VOQ_k$ $1155_1$-$1155_{n-m}$, the active probing pace control described in § 5.2.2.2.2 above may be used to detect the queuing delay at one of the reservoir ports of the core switch 1120. The total occupancy at reservoir ports of the core switch 1120 can be obtained by the following equation:

$$(a) \quad q_{rsvr}[i] = d_{probe}[i] \times C \times m \tag{3}$$

The reservoir 1150 also measures data arrival rate at each VOQ k: $r_{in}^k[i]$. The estimated occupancy of packets in the core switch 1120 destined to output port k can be expressed as:

$$q_{rsvr}^k[i] = q_{rsvr}[i] \times \frac{r_{in}^k}{\sum_{p=1}^{n-m}(r_{in}^p[i])} \tag{4}$$

Then, a PID control formula similar to (2) described in § 5.2.2.2.2 above can be used to decide $r_{out}^k[i]$. It should be noted that $r_{out}^k[i]$ is to be bounded in [0, C] interval, even though the reservoir 1150 has a maximum output bandwidth of m×C.

§ 5.3.3 Active Queue Management

Each VOQ$1155_1$-$1155_{n-m}$ in the reservoir 1150 can be divided into multiple logical queues corresponding to flows, classes, priorities, or other principles. First arbiters 1160 (e.g., using round-robin scheduling) can be used between these logical queues to schedule packets to the corresponding cushion buffer 1170 (or the corresponding leaky bucket (not shown)) at the output rate $r_{out}^k[i]$. An AQM scheme can also be applied on each logical queue to drop/mark packets when the queue length exceeds certain threshold, so that the corresponding TCP senders can be informed about the congestion to slow down their sending rates. With such design, the reservoir 1150 can provide fine-grained flow isolation to prevent low-rate flows from being affected by high-rate ones.

§ 5.4 Conclusions

Memory reservoir systems consistent with the present invention buffer packets instead of actively dropping them. Consequently, excessive packet drops are avoided, which is especially useful for use with shallow-buffered core switches. Various AQM schemes, either drop-based or marking-based, can be used with its software-based intelligence. Thus, example systems consistent with the present invention preserve congestion control properties of AQM, while achieving nimbler congestion mitigation using its buffer.

In the context of NFV, the transit switch can continuously monitor the occupancy of (each of) its packet buffers. When a high congestion level is detected, the switch can preventively diverts part of the bursty traffic for a local detour, to a VM-based reservoir running in the local NFVI cloud (or a physical server based reservoir that is connected to the switch via one or multiple reserved switch ports). Then the reservoir "paces" the detoured traffic to be returned to the transit switch such that the burstiness is mitigated. Example embodiments consistent with the present invention can combine the strengths of commodity hardware and customized virtual network functions.

Example embodiments consistent with the present invention can be located at a physical server that is connected to the protected switch via one or multiple reserved switch ports, or at NFVI clouds near the protected switch.

When used as a software-based solution, example embodiments consistent with the present invention can provide agile and elastic protection to switches against traffic bursts to reduce packet loss and flow/task competition time at very lost cost.

From the network operator's perspective, the network infrastructure can tolerate higher traffic burstiness, and thus achieve higher link utilization under the same packet buffer budget. From the end users' perspective, packet drops and transport layer backoffs are reduced. Consequently, the end user's quality of experience can be improved.

Among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, "section," "unit," "component," "element," "module," "device," "member," "mechanism," "apparatus," "machine," "function" or "system" may be implemented as circuitry, such as integrated circuits, application specific circuits ("ASICs"), field programmable logic arrays ("FPLAs"), etc., and/or software implemented on one or more processors, such as a microprocessor(s). For example, apparatus 1200 of FIG. 12 may be used to perform at least some operations, and store at least some information, in a manner consistent with the present invention. The apparatus 1200 may include one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230.

The one or more processors 1210 may execute machine-executable instructions (e.g., C or C++ running on the Linux operating system widely available from a number of vendors such as Red Hat, Inc. of Durham, N.C.) to perform one or more aspects of the present invention. For example, one or more software modules, when executed by a processor, may be used to perform one or more of the methods described above. At least a portion of the machine executable instructions may be stored (temporarily or more permanently) on the one or more storage devices 1220 and/or may be received from an external source via one or more input interface units 1230.

In one embodiment, the machine 1200 may be one or more conventional personal computers or servers. In this case, the processing units 1210 may be one or more microprocessors. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1232, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1210 through an appropriate interface 1230 coupled to the system bus 1240. The output devices 1234 may include a monitor or other type of display device, which may also be connected to the system bus 1240 via an appropriate interface. In addition to (or instead of) the monitor, the personal computer may include other (peripheral) output devices (not shown), such as speakers and printers for example.

The operations described above may be performed on one or more computers. Such computers may communicate with each other via one or more networks, such as the Internet for example.

The present invention is not limited to the example embodiments described above, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A computer-implemented method for handling network traffic surges at a shallow-buffered switch, the computer-implemented method comprising:
   a) receiving by the switch, a packet;
   b) extracting destination information from the packet;
   c) looking up, using the extracted destination information, an output port for the packet;
   d) determining whether or not to redirect the packet based on a congestion level of a buffer associated with the output port;
   f) responsive to a determination to redirect the packet,
      1) dispatching the packet to a dedicated reservoir port of the switch, wherein the reservoir port enforces a queue discipline,
      2) receiving, by a reservoir, the redirected packet,
      3) temporarily buffering, in an internal queue of the reservoir, the received, redirected packet, and
      4) sending the temporarily buffered, received, redirected packet back to the switch, and
   otherwise, responsive to a determination to not redirect the packet, dispatching the packet to the output port of the switch.

2. The computer-implemented method of claim 1 wherein any packets sent back to the switch are paced such that collisions and congestion at the switch output port is relieved.

3. The computer-implemented method of claim 2 wherein any packets sent back to the switch are paced such that collisions and congestion at the switch output port is relieved by (1) providing a leaky bucket (LB) at an exit of the internal queue of the reservoir, and (2) adaptively setting a drain rate of the leaky bucket.

4. The computer-implemented method of claim 3 wherein the drain rate of the leaky bucket is adaptively set based on a congestion status of the switch inferred from information directly available at the reservoir.

5. The computer-implemented method of claim 4 wherein the congestion status of the switch is inferred by
   1) repeatedly monitoring a number of packets received by the reservoir,
   2) repeatedly calculating a rate of data detouring to the reservoir based on the monitored number of packets received by the reservoir, and
   3) inferring that the congestion status of the switch is "congested" responsive to a determination that the calculated rate of data is greater than a preset threshold, and otherwise, inferring that the congestion status of the switch is "not congested" responsive to a determination that the calculated rate of data is not greater than the preset threshold.

6. The computer-implemented method of claim 4 wherein the congestion status of the switch is inferred by
   1) periodically sending out, from the reservoir, with highest priority, a probe packet to the dedicated reservoir port of the of the switch, wherein the probe packet contains a timestamp marking its exit time from the reservoir,
   2) recording the timestamp of the sent probe packet,
   3) receiving by the reservoir, back from the switch, the previously sent probe packet,
   4) calculating a total time delay experienced by the probe packet using the recorded time stamp and a time the probe packet was received back from the switch by the reservoir, and
   5) inferring a switch congestion value from the total time delay.

7. The computer-implemented method of claim 1 wherein any packets sent back to the switch from the reservoir are forwarded to the intended output port with a highest priority.

8. The computer-implemented method of claim 1 wherein any packets sent back to the switch from the reservoir are not checked for further redirection more than a predetermined number of times (n) such that no packet can traverse the reservoir more than n−1 times.

9. The computer-implemented method of claim 1 wherein the act of determining whether or not to redirect the packet based on a congestion level of a buffer associated with the output port includes 1) determining whether or not the buffer associated with the output port is full, and
2) determining to redirect the packet responsive to a determination that the buffer associated with the output port is full, and otherwise, determining to not redirect the packet responsive to a determination that the buffer associated with the output port is not full.

10. The computer-implemented method of claim 1 wherein the act of determining whether or not to redirect the packet based on a congestion level of a buffer associated with the output port includes
1) querying an active queue management (AQM) module of the output port for a drop/mark determination;
2) responsive to receiving a drop/mark determination from the AQM module, determining to redirect the packet instead of dropping the packet, and otherwise, responsive to receiving a determination from the AQM module to not drop/mark, not determining to redirect the packet.

11. The computer-implemented method of claim 1 wherein the reservoir is provided outside of the shallow-buffered switch.

12. The computer-implemented method of claim 11 wherein the reservoir is coupled with at least one input port of the shallow-buffered switch and at least one output port of the shallow-buffered switch.

13. A computer-implemented method for handling network traffic surges at a shallow-buffered switch, the computer-implemented method comprising:
a) receiving by the switch, a packet;
b) extracting a destination information from the packet;
c) performing an IP lookup, using the extracted destination information, to determine an output port of the switch;
d) querying an active queue management (AQM) module of the output port for a redirection probability between 0 and 1;
e) receiving from the AQM module a redirection probability between 0 and 1;
f) generating a uniform random floating point number for the packet;
g) determining to redirect the packet when r q, where r is the random number and q is the retrieved redirection probability, and otherwise, not determining to redirect the packet; and
h) responsive to a determination to redirect the packet, forwarding the packet to a dedicated reservoir port of the switch to effect a redirection of the packet to a reservoir, and otherwise, responsive to a determination to not redirect the packet, not forwarding the packet to the reservoir.

14. A computer-implemented method for handling network traffic surges at a shallow-buffered switch, the computer-implemented method comprising:
a) receiving by the switch, a packet;
b) extracting a destination information from the packet;
c) performing an IP lookup, using the extracted destination information, to determine an output port of the switch;
d) querying an active queue management (AQM) module of the output port for a redirection probability between 0 and 1;
e) receiving from the AQM module a redirection probability between 0 and 1;
f) extracting from the packet, transport layer flow information;
g) mapping, using a hash function, the extracted transport layer flow information to a pseudo-random number within a hash range of the hash function;
h) calculating a redirection region with the hash range based on the received redirection probability;
i) determining to redirect the packet responsive to a determination that the pseudo-random number corresponding the received packet is within the redirection region, and otherwise, responsive to a determination that the pseudo-random number corresponding to the received packet is not within the redirection region, not determining to redirect the packet; and
j) responsive to a determination to redirect the packet, forwarding the packet to a dedicated reservoir port of the switch to effect a redirection of the packet to a reservoir, and otherwise, responsive to a determination to not redirect the packet, not forwarding the packet to the reservoir.

15. A computer-implemented method for relieving network traffic surges at an external shallow-buffered switch, the computer-implemented method comprising:
a) receiving, by a reservoir, a redirected packet dispatched from a reservoir port of the switch;
b) temporarily buffering, in an internal queue of the reservoir, the received, redirected packet; and
c) sending the temporarily buffered, received, redirected packet back to the external switch in a paced manner such that collisions and congestion at an output port of the external switch is relieved,
wherein the redirected packet is sent back to the switch in a paced manner such that collisions and congestion at the switch output port is relieved by (1) providing a leaky bucket (LB) at an exit of the internal queue of the reservoir, and (2) adaptively setting a drain rate of the leaky bucket, wherein the drain rate of the leaky bucket is adaptively set based on a congestion status of the external switch inferred from information directly available at the reservoir, and
wherein the congestion status of the external switch is inferred by either
1) repeatedly monitoring a number of packets received by the reservoir,
2) repeatedly calculating a rate of data detouring to the reservoir based on the monitored number of packets received by the reservoir, and
3) inferring that the congestion status of the external switch is "congested" responsive to a determination that the calculated rate of data is greater than a preset threshold, and otherwise, inferring that the congestion status of the external switch is "not congested" responsive to a determination that the calculated rate of data is not greater than the preset threshold, or
by
1) periodically sending out, from the reservoir, with highest priority, a probe packet to the dedicated reservoir port of the of the external switch, wherein the probe packet contains a timestamp marking its exit time from the reservoir,
2) recording the timestamp of the sent probe packet,
3) receiving by the reservoir, back from the external switch, the previously sent probe packet,
4) calculating a total time delay experienced by the probe packet using the recorded time stamp and a time the probe packet was received back from the external switch by the reservoir, and 5) inferring a switch congestion value from the total time delay.

16. A reservoir for relieving network traffic surges at an external shallow-buffered switch, reservoir comprising:
   a) an input port for receiving a redirected packet dispatched from a reservoir port of the external switch;
   b) an internal queue temporarily buffering the received, redirected packet; and
   c) a scheduler for sending the temporarily buffered, received, redirected packet back to the external switch in a paced manner such that collisions and congestion at an output port of the external switch is relieved, wherein the scheduler includes a leaky bucket (LB) at an exit of the internal queue of the reservoir and wherein the scheduler sends the redirected packet back to the switch in a paced manner such that collisions and congestion at the switch output port is relieved adaptively setting a drain rate of the leaky bucket, and wherein the drain rate of the leaky bucket is adaptively set based on a congestion status of the external switch inferred from information directly available at the reservoir; and
   d) a controller, wherein the controller infers the congestion status of the external switch by either
      1) repeatedly monitoring a number of packets received by the reservoir,
      2) repeatedly calculating a rate of data detouring to the reservoir based on the monitored number of packets received by the reservoir, and
      3) inferring that the congestion status of the external switch is "congested" responsive to a determination that the calculated rate of data is greater than a preset threshold, and otherwise, inferring that the congestion status of the external switch is "not congested" responsive to a determination that the calculated rate of data is not greater than the preset threshold, or
   by
      1) periodically sending out, from the reservoir, with highest priority, a probe packet to the dedicated reservoir port of the of the external switch, wherein the probe packet contains a timestamp marking its exit time from the reservoir,
      2) recording the timestamp of the sent probe packet,
      3) receiving by the reservoir, back from the external switch, the previously sent probe packet,
      4) calculating a total time delay experienced by the probe packet using the recorded time stamp and a time the probe packet was received back from the external switch by the reservoir, and
      5) inferring a switch congestion value from the total time delay.

17. A reservoir for relieving network traffic surges at an external shallow-buffered switch having a plurality of output ports and at least one reservoir port, reservoir comprising:
   a) at least one input port for receiving redirected packets dispatched from the at least one reservoir port of the external switch;
   b) at least one output port for sending redirected packets back to the external switch;
   c) a plurality of internal queues, each of the plurality of internal queues
      1) corresponding to one of the plurality of output ports of the external switch, and
      2) temporarily buffering those of the received redirected packets from the external switch that were destined for the corresponding output port of the external switch, and
   d) a scheduler including
      1) a plurality of cushion buffers, each of the cushion buffers
         A) corresponding to one of the plurality of internal queues, and
         B) having a capacity that is smaller than its corresponding internal queue,
      2) a plurality of first arbiters, each of the first arbiters
         A) corresponding to one of the plurality of internal queues, and
         B) configured for deciding when to send packets from its corresponding queue to the corresponding cushion buffer in a paced manner such that collisions and congestion at an output port of the external switch is relieved, the scheduler, and
      3) a second arbiter adapted to schedule forwarding of redirected packets from the plurality of cushion buffers to the at least one output port.

18. The reservoir of claim 17 wherein each of the plurality of internal queues is divided into one of (A) per-flow, (B) per-class, or (C) per-priority queues.

19. The reservoir of claim 17 wherein each of the first arbiters includes a leaky bucket (LB) at an exit of its corresponding internal queue, and wherein a drain rate of the leaky bucket is adaptively set based on a congestion status of the external switch at the corresponding output port inferred from information directly available at the reservoir.

20. The reservoir of claim 17 wherein the second arbiter is a round-robin arbiter.

* * * * *